United States Patent [19]

Hillman

[11] 4,186,320
[45] Jan. 29, 1980

[54] HYSTERESIS BRAKE ASSEMBLY

[75] Inventor: Darrel D. Hillman, Weatherford, Tex.

[73] Assignee: Electromatic Drive Corporation, Fort Worth, Tex.

[21] Appl. No.: 844,311

[22] Filed: Oct. 21, 1977

[51] Int. Cl.² .......................................... H02K 49/00
[52] U.S. Cl. ...................................... 310/93; 310/103; 310/105
[58] Field of Search .................. 310/93, 103, 105, 62, 310/63, 268

[56] References Cited

U.S. PATENT DOCUMENTS

| | | | |
|---|---|---|---|
| 2,575,000 | 11/1951 | Bessiere | 310/93 |
| 2,603,678 | 7/1952 | Helmer | 310/103 |
| 2,640,941 | 6/1953 | Winther | 310/93 |
| 2,733,361 | 1/1956 | Bessiere | 310/93 |
| 2,796,541 | 6/1957 | Bessiere | 310/62 X |
| 2,806,158 | 9/1957 | Emery et al. | 310/103 |
| 2,818,516 | 12/1957 | Bessiere | 310/93 |
| 3,267,310 | 8/1966 | Ireland | 310/103 |

*Primary Examiner*—Donovan F. Duggan
*Attorney, Agent, or Firm*—Wofford, Fails & Zobal

[57] ABSTRACT

A hysteresis brake assembly comprising a fan member, a vaned heat dissipating cover member, a pair of pole members, a pair of hub members and a disc shaped ferro-magnetic brake member. The fan propells air through holes provided in the cover and one pole member and the air is directed by vanes on a first hub member to flow (1) in part over one side of the brake disc and (2) in part through holes in the brake disc to the other side of the brake disc, where a second vaned hub directs the air over the other side of the brake disc; thereby cooling the brake disc on both sides. After cooling the brake disc, the air is forced outward from the brake assembly through escape holes provided in the cover member and one pole member.

21 Claims, 15 Drawing Figures

HYSTERESIS BRAKE ASSEMBLY

BACKGROUND OF THE INVENTION

1. Field of the Invention

This invention relates to the construction of air cooled hysteresis brake assemblies.

2. Prior Art

It is a well known phenomenon that a permeable disc rotating in a magnetic field will have eddy currents induced on the rotating disc and that such eddy currents will produce a magnetic field which opposes the first magnetic field thereby producing a force which tends to damp the rotation of the disc. The magnitude of the force is proportional to the strength of the magnetic field in which the permeable material rotates. The application of this force results in the generation of heat within the rotating disc. If enough heat is generated the rotating disc must be cooled to avoid damage.

In the commercial construction of such eddy current (or hysteresis) type brakes, it is desirable to obtain as much braking force as possible and yet at the same time keep the size of the brake assembly relatively small. In order to obtain maximum braking force, prior art brakes were constructed in the shape of a cup. (See U.S. Pat. No. 3,700,941 to Duncan). Such brakes had a disc like portion located perpendicular to the axis of rotation and a wall section extending axially to one side of the disc portion. A first pole member would be located radially outside of the wall and a second pole member would be located radially inside of the wall. In this way the eddy currents and resulting braking force would be produced in the wall member, substantially at a radial distance equal to the radius of the disc member. This would maximize the lever arm of the braking force and thus produce maximum braking torque. A major disadvantage with this type of construction has been that the resulting structure is longer than desired in the axial dimension and the brake assembly must be lengthened to accomodate the axial dimension of the walls of the brake member.

In an effort to construct a brake assembly of compact dimensions, various attempts have been made to design and employ a brake member which is a simple disc, extending perpendicular to the axis of rotation, having no wall component extending in the axial direction. If such a brake assembly were feasible, it would result in a compact brake, whose axial dimension was less than prior art designs employing a cup-like brake member. Prior attempts to employ a disc-shaped brake member have proven unsuccessful for a variety of reasons. Primary among the reasons for these unsuccessful attempts has been the inability of such designs to adequately remove heat from the rotating disc. To prevent deformation of the brake disc, the heat must be removed uniformly on both sides of the brake disc.

It is desirable to use a brake member which is disc shaped so as to reduce construction costs and simplify the manufacturing process. However, a disc shaped brake member having the same radius as a cup shaped brake member will produce less braking torque than the cup member for a given strength magnetic field. Thus, to increase the braking torque output of the disc shaped braking member, the strength of the magnetic field must be increased. This produces greater heating of the disc member than would be produced in a cup member producing the same braking torque.

Prior hysteresis brake designs employing a disc shaped brake member were unsuccessful in part because they could not overcome the increased heating problems.

It is therefore an object of the present invention to provide an eddy current hysteresis type brake assembly which employs a flat disc shaped brake member.

It is a further object to provide an eddy current hysteresis type brake assembly which employes a flat disc shaped brake member and also developes a braking torque equal to or greater than the torque developed by a comparably sized brake assembly employing a cup shaped brake member.

It is another object to provide a brake member which is simple to manufacture and lower in cost to manufacture than brake members of the prior art. It is yet a further object to provide such a brake assembly which because of efficient and novel cooling means does not suffer adversely due to the heat generated in the brake member.

It is an object of the present invention to provide an eddy current hysteresis type brake assembly which employs a flat disc shaped brake member which therefore results in a compact brake assembly structure and requires a reduced amount of materials for its construction.

It is still another object to provide such a brake assembly which cools both sides of the flat disc shaped brake member equally and uniformly thereby resulting in increased smoothness of operation, minimum warpage and wear and maximum brake life.

It is an object of the present invention to provide a compact eddy current hysteresis type brake assembly which can generate higher braking torques than similar brake assemblies of prior art designs and larger size.

SUMMARY OF THE INVENTION

The hysteresis brake assembly of the present invention comprises a fan member, a vaned heat dissipating cover member, a pair of pole members, a pair of hub members, and a flat disc shaped highly permeable ferromagnetic brake member. The fan member propels air from outside the brake assembly through holes provided in the cover member to the inside of the brake assembly. The air continues to flow through a large central hole provided in a first pole member to a position proximate the first hub member. At this point the vanes provided on the first hub member direct the air flow such that it is divided into two portions. The first portion is directed perpendicularly to the axis of rotation and flows radially outward over the first surface of the brake member to the perimeter thereof. The second portion of the air flow is directed axially from the first side of the brake member, through holes provided in the brake member to the other side of the brake member at which point the vanes of the second hub member direct the second portion of the air flow perpendicularly to the axis of rotation and radially outward over the second surface of the brake member toward the perimeter thereof. This flow of air over both surfaces of the brake member equally and uniformly cools both surfaces of the brake member. After cooling the brake member, the air flows axially out from the brake assembly through exhaust holes provided in both pole members and the cover member.

Further objects and advantages of the eddy current hysteresis type brake of the present invention will become apparent to those skilled in the art from the following description of the preferred embodiment when read in light of the drawings.

DETAILED DESCRIPTION OF THE PREFERRED EMBODIMENT

Figure 1:
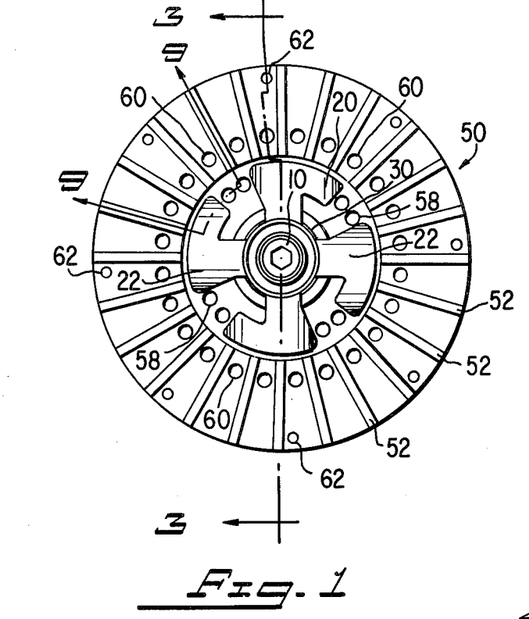
FIG. 1 is an end view of the assembled eddy current brake.
Figure 2:
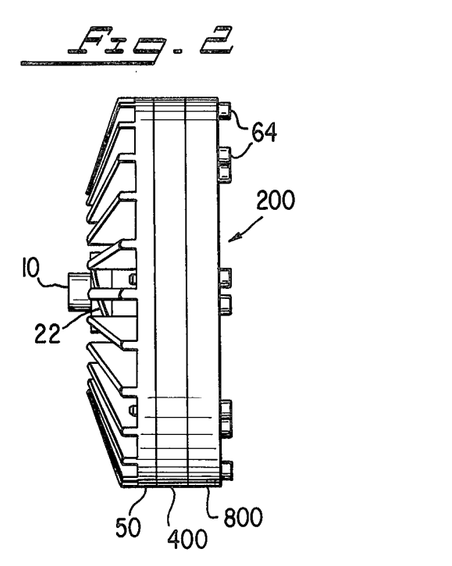
FIG. 2 is a side view of the brake of FIG. 1.

Views of the assembled hysteresis brake 200 of the present invention are given in FIG. 1 and FIG. 2. FIG. 1 is an end view of the brake assembly. An axially positioned bolt 10 secures the fan 20 against a bearing member 30 so that the fan is freely rotatable with respect to the brake assembly cover member 50. The fan 20 is provided with blades 22 and a circular axial hole 24 which allows bolt 10 to pass through the fan.

As fan blades 22 rotate with respect to the cover member 50 they force air to the interior of the brake assembly 200 through air inlet holes 58. After the air performs its cooling function, the same air is forced out through air exhaust holes 60 in cover member 50. Other features of cover member 50 include vanes 52 and threaded holes 62 which receive the threaded ends of assembly bolts 64 shown in FIG. 3.

FIG. 2 shows a side view of the assembled brake assembly 200, this view illustrates how bolt 10 secures the fan 20 to the assembly within a recess formed in the central portion of cover member 50 and defined by the ends of vanes 52 which lie closest to the axis of rotation of the fan 20. FIG. 2 also illustrates the fact that cover member 50, the first pole member 400 and the second pole member 800 are the only major members visible from the exterior of the assembled brake assembly. As is more fully illustrated below, first pole member 400 and second pole member 800 when assembled define a cavity therebetween which houses the brake member 600 and the first hub member 500 and the second hub member 700. As illustrated in FIG. 2, the externally visible cover member 50, first pole member 400 and second pole member 800 are held together in assembled relationship by assembly bolts 64 which extend through assembly holes 828 in the second pole member, assembly holes 428 in the first pole member and threaded assembly holes 62 in cover member 50.

Figures 3, 10:
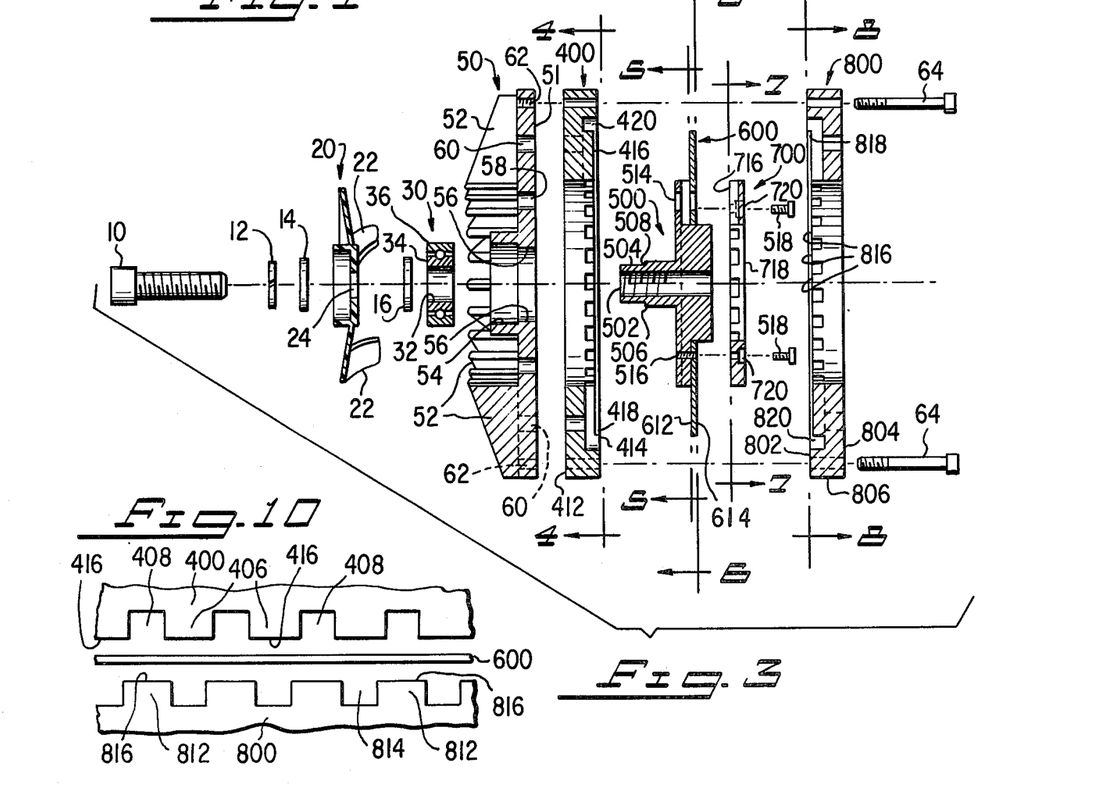
FIG. 3 is an exploded cutaway of the brake assembly taken along the line 3—3 of FIG. 1.
FIG. 10 is a simplified version of FIG. 9, having certain elements removed from FIG. 9 for clarity.

FIG. 3 is an exploded view of the components of the eddy current type hysteresis brake of the present invention. Axial bolt 10 passes through lock washer 12, first spacer washer 14, through the circular axial hole 24 in fan 20, then through second spacer washer 16, through the hole defined by the inner cylindrical surface 32 of inner bearing member 34, through the hole defined by the inner cylindrical surface 56 in cover member 50 and mates with the interior threads of threaded axial hole 502 of the first hub member 500. Bolt 10 thereby secures fan 20 and first hub member 500 such that they will not rotate relative to one another. Second spacer washer 16 is of a diameter equal to or less than the diameter of the inner bearing member 34, and is placed between the fan 20 and the inner bearing member 34. Fan 20 is therefore in direct mechanical contact with the inner bearing member 34 which is freely rotatable with respect to the outer bearing member 36. Outer bearing member 36 is press fit into a bearing seat 54 provided on cover member 50. This press fit prevents outer bearing member 36 from rotating with respect to cover member 50. Fan 20 is therefore also free to rotate with respect to cover member 50.

The diameter of the inner cylindrical surface 32 of inner bearing member 34 is slightly greater than the diameter of outer cylindrical surface 504 of the first hub member 500, and when assembled outer cylindrical surface 504 extends within the inner bearing member 34 of bearing 30 and is held firmly in place by a mating engagement with axial bolt 10. Axial bolt 10 therefore secures lock washer 12, first spacer washer 14, fan 20, second spacer washer 16, the inner bearing member 34 and the first hub member 500 so that all rotate as a unit with respect to the cover member 50, the first pole member 400 and the second pole member 800.

FIG. 3 serves to clearly illustrate the assembled relationship of the cover member 50, the first and second pole members (400 and 800), first and second hub members (500 and 700) and the brake member 600. The first side 412 of member 400 is placed in contact with the flat side 51 of cover member 50 and axially aligned therewith. The first pole member 400 and the second pole member 800 are assembled such that the second surface 414 of pole member 400 is in contact with the first surface 802 of pole member 800. These two pole members are so formed as to define a cavity between them which is shaped so that it can receive the structure comprised of the first and second hub members (500 and 700) and the brake member 600. This structure is more fully defined below. It should be noted at this point that the upper surface 416 of the teeth 406 of the first pole member 400 are at a lesser distance from the first surface 412 of the first pole member 400 than is the second side 414.

The distance between surface 416 and surface 414 provides a slight recess 418 which is matched by a corresponding slight recess 818 in the first surface 802 of the second pole member 800. When the first pole member 400 and the second pole member 800 are brought together in their assembled position, these two recesses combine to form a space of sufficient depth as to accomodate the brake member 600. As illustrated in FIG. 3, the first hub member 500, the brake member 600 and the second hub member 700 are secured to one another by bolts 518. These bolts pass through the second hub member 700 through the holes 714, and then pass through the brake member 600 through holes 606, and thereafter mate with the threaded holes 516 in the first hub member 500. The heads of bolts 518 fit within recesses 720 provided on the second hub member 700 such that the top of the heads of bolts 518 are flush with the second side 718 of the second hub member 700. Bolts 518 therefore cause the second hub member 700 and the brake member 600 to rotate as a unit with the rest of the assembly described above which rotates as a unit with the first hub member 500.

First pole member 400 and second pole member 800 have complementary annular cavities designated as 420 and 820 respectively. These cavities serve to house a coil of electrically conductive material such as a wire. This electrically conductive material or wire is not shown in FIG. 3 in order to avoid unnecessary cluttering of the FIGURE. By passing an electrical current through the wire a magnetic field is induced in each of the teeth 406 and 812 which are provided on the first and second pole members respectively. These magnetic fields attempt to produce a constantly changing polarity through the rotating brake disc member 600. The rotating brake disc member 600 being a permanent magnetic material opposes these changes. This opposition to changing polarity results in the application of a force upon the rotating brake disc member 600 which causes its rotational speed to decrease. The phenomenon of the hysteresis brake is well known in the art and no further explanation than that just given will be attempted herein. It is not the hysteresis brake phenomenon that is the subject of this invention, but rather the function and structure of the parts as described herein which enable the construction of a hysteresis brake having a flat disc shaped brake member which applicant claims as his invention.

Figure 4:
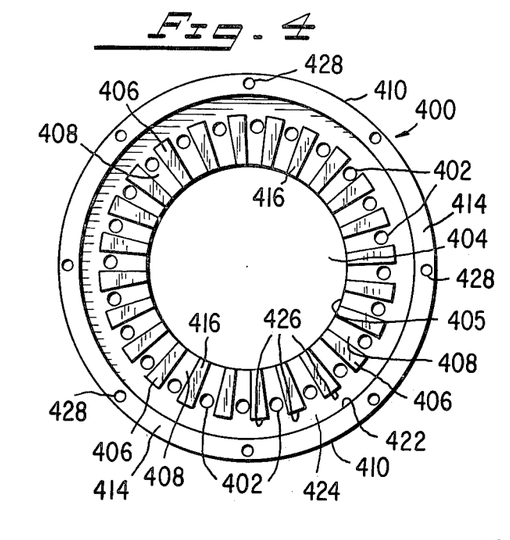
FIG. 4 is an illustration of the structural features of the first pole member as if viewed in the direction of section line 4—4 of FIG. 3.

For a more thorough description of the first pole member 400, reference may now be had to FIG. 4. The first pole member 400 is provided with a plurality of air exhaust holes 402. It is through these holes that the air flow is directed after the air has cooled the brake member 600. The first pole member is also provided with a hole 404 defined by the cylindrical surface 405 which is of a diameter slightly larger than the outer diameter of the first hub member 500. The first pole member 400 is capable of receiving the first hub member 500 within the hole 404. Located radially around the hole 404 is a plurality of teeth 406 separated by a plurality of recesses 408. The recess 408 serves as a channel which directs the flow of air out towards the air exhaust holes 402. The first pole member 400 is defined by the outer cylindrical surface 410, the inner cylindrical surface 405, the first side numbered 412 and the second side 414. The teeth 406 extend axially towards their upper surface 416 which is in a direction from the first side 412 towards the second side 414. The distance from the first side 412 to the upper surface of the teeth 416 is slightly less than the distance from the first side 412 to the second side 414. This slight difference defines a recess which in combination with the complementary recess provided on the second pole member 800 provides a space within which the brake member 600 is free to rotate. This recess is designated generally as 418 in FIG. 3. An annular cavity 420 is also provided on the first pole member 400. The purpose of this cavity is to receive an electrically conductive means such as a coil of wire. The annular cavity 420 is defined by a first surface designated as 422, a second surface designated 424 and a series of third surfaces designated 426 all as illustrated in FIG. 4. The first surface 422 is an axially extending cylindrical surface. The second surface 424 is a radially extending surface, and the third surfaces 426 are axially extending surfaces defined by the ends of the plurality of teeth 406 which face the first axially extending surface 422. Provided around the perimeter of the first pole member 400 and located on the second side 414 is a plurality of assembly holes 428. These holes allow the assembly bolt 64 to pass through the first pole member 400 to the cover member 50, and the threaded holes 62 located thereon. It should be noted that the device of FIG. 4 is structurally identical to the device of FIG. 8. The assembly holes 428 and assembly holes 828 are so located that the first and second pole members are assembled such that the teeth of one member are opposite the recesses of the other member. This feature is more clearly illustrated in FIG. 10 to be described later.

Figure 5:
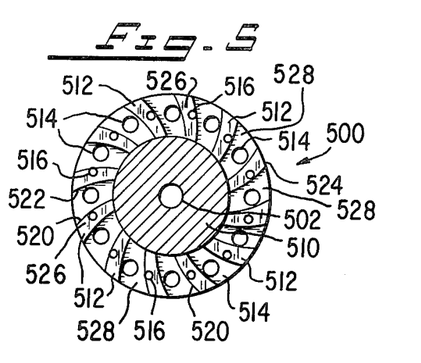
FIG. 5 is an illustration of the features of the first hub member as if viewed in the direction of section line 5—5 of FIG. 3.

The first hub member 500 shown in FIG. 3 and FIG. 5, is provided with a threaded axial hole 502. This internally threaded hole has threads which mate with the external threads of the axial bolt 10. This hub member is also provided with an exterior axially extending cylindrical surface designated 504, the diameter of which is slightly less than the diameter of the inner cylindrical surface 32 of the inner bearing member 34. This outer cylindrical surface 504 intersects a radially extending surface 506 and thereby defines a seat 508. This seat seats the inner bearing member 34 on the first hub member 500. This first hub member 500 is provided with a solid central portion designated 510 in FIG. 5. A plurality of arcuate air vanes 512 extend from the solid hub 510 to the outer perimeter 524, each arcuate air vane being separated from the next by a recess 528. These air vanes 512 propel air flowing through the air flow hole 514 causing it to flow across the first side 612 of the brake member 600. A plurality of threaded assembly holes 516 is provided with threads which mate with the exterior threads of assembly bolts 518. Assembly bolts 518 secure the second hub member 700 and the brake member 600 to the first hub member 500. Each arcuate air vane 512 is defined by the outer surface of the solid hub 510, the outer perimeter 524 of hub member 500, a front surface 520 and a rear surface 522. Each air flow hole 514 has a corresponding arcuate air vane 512. When the first hub member 500 is secured in place by the assembly bolts 518, the flat surface 526 of each of the arcuate air vanes 512 is in intimate contact with the first side 612 of the brake member 600. It can thus be seen that an air passage is formed and defined by a recess 528, an air flow hole 514, a front surface 520 of one arcuate air vane and a rear surface 522 of an adjacent arcuate air vane and the first side 612 of brake member 600.

Figure 6:
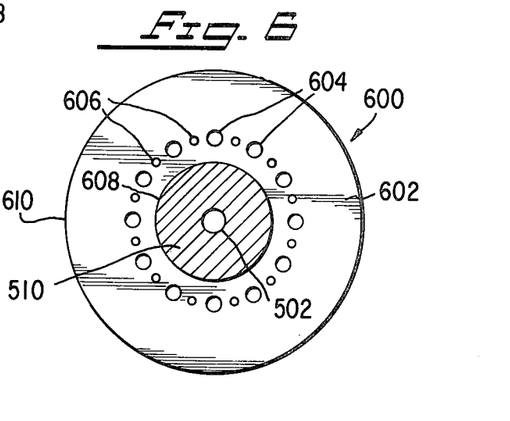
FIG. 6 is an illustration of the features of the brake member as if viewed in the direction of the section line 6—6 of FIG. 3.

FIG. 6 illustrates the brake member 600 which consists of a ferro-magnetic disc 602 which is highly permeable to magnetic flux. This brake member is provided with air flow holes 604 which allow a portion of the air coming through the air flow holes 514 on first hub member 500 to reach the second side 614 of the brake member 600. The brake member 600 is defined by an inner perimeter 608 and outer perimeter 610, its first side 612 and its second side 614. The inner perimeter 608 defines an axial hole of a diameter slightly larger than that of the solid portion 510 of the first hub member 500 thereby allowing the brake member to fit upon this part of the first hub member. This brake member 600 is provided with a plurality of holes 606 by which the brake member is secured by bolts 518 against rotation with respect to the first hub member 500 and the second hub member 700. The brake member 600 is positioned between the first hub member 500 and the second hub member 700.

Figure 7:
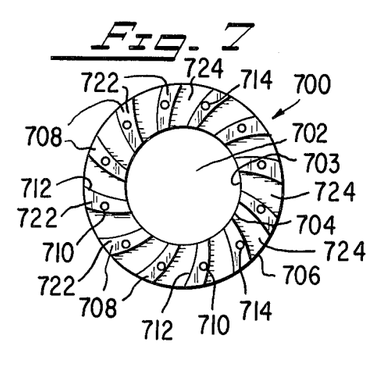
FIG. 7 is an illustration of the features of the second hub member as if viewed in the direction of section line 7—7 of FIG. 3.

The second hub member 700 is illustrated in FIG. 7 and is defined by an inner perimeter 704, an outer perimeter 706, a first side 716 and a second side 718. The second hub member is provided with an axially extending hole 702 which is defined by an inner cylindrical surface 703. The diameter of this axial hole 702 is slightly larger than the solid portion 510 of the first hub member 500, and allows the second hub member 700 to slide over the solid hub 510 of the first hub member 500. The second hub member 700 is very much like the first hub member 500 except that it does not have a solid central portion and it does not have any air flow holes. Like the first hub member 500, the second hub member 700 is provided with a plurality of arcuate air vanes 708. These vanes are defined by a front surface 710, a back surface 712, the inner cylindrical surface 703, the outer perimeter 706 and their flat surfaces designated as 722. When the second hub member 700 is in its assembled position, the flat vane surfaces 722 are in intimate contact with the second side 614 of the brake member 600. The recesses 724 between adjoining vanes on the second hub member 700, in combination with the second side 614 of the brake member 600, defines an air passage way which directs the flow of air from the air flow holes 604 radially outward over the second side 614 of the brake member 600. The second hub member 700 is also provided with a plurality of assembly holes 714. Through these holes pass the bolts 518 which secure the second hub member 700 to the brake member 600 and the first hub member 500. As illustrated in FIG. 3, the second side 718 of the second hub member is provided with a plurality of recesses 720 which are located over the assembly holes 714. These recesses 720 are cylindrical and of a size sufficient to allow the assembly bolts 518 to be tightened to a degree such that the head of the bolt 518 is flush with the second side 718 of the second hub member 700. The outer diameter of the second hub member 700 is slightly less than the diameter of the axial hole 809 provided in the second pole member 800. In the assembled position, the second hub member 700 resides within the cavity defined by the axial hole 809.

Figure 8:
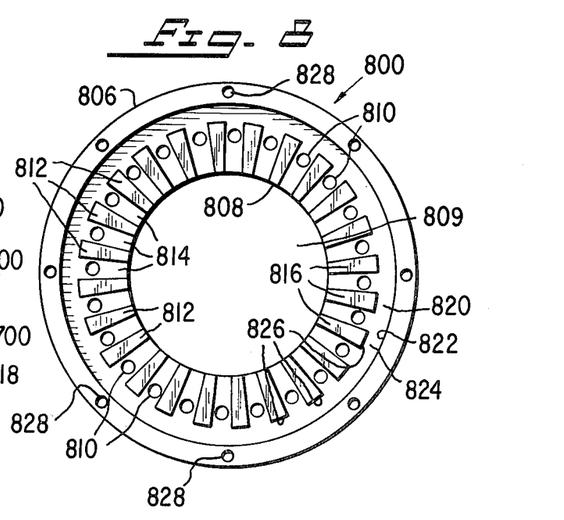
FIG. 8 is an illustration of the features of the second pole member as if viewed in the direction of the section line 8—8 of FIG. 3.

The second pole member 800 which is shown in FIG. 8 is very much like the first pole member 400 shown in FIG. 4. The second pole member has a first side designated 802 and a second side designated 804 as shown in FIG. 3. FIG. 8 is an illustration of the features of the first side 802 of the second pole member 800. The second pole member is defined by an outer cylindrical surface 806, an inner cylindrical surface 808 and the first side 802 and second side 804. The inner cylindrical surface 806 also defines an axial hole 809. The diameter of this axial hole 809 is slightly larger than the diameter of the outer perimeter 706 of the second hub member 700 such that the second hub member can be received within the axial hole 809. The second pole member is provided with a plurality of air exhaust holes 810 similar to the air exhaust holes 402 provided on the first pole member 400. There is also provided a plurality of teeth 812, each tooth being separated from the next by a recess 814. These teeth 812 are similar to the teeth 406 provided on the first pole member. The second pole member 800 is also provided with an annular cavity 820, the function of which is to receive an electrically conductive means such as a coil of wire. This cavity 820 is defined by a first surface 822, a second surface 824 and a series of third surfaces 826. The first surface 822 is an axially extending inner cylindrical surface. The second surface 824 is a radially extending annular surface. The series of third surfaces 826 are axially extending outer cylindrical surfaces comprising the radially outer end of teeth 812. These three surfaces define three sides of a cavity comprised of the annular cavity 420 and the annular cavity 820 which together define the cavity which houses the electrically conductive means such as a coil of wire. Each of the teeth 812 are defined by the inner cylindrical surface 808, the series of third surfaces 826, two of the plurality of recesses 814 and what is referred to as the upper surface 816 of each tooth. The distance between the second side 804 and the first side 802 is greater than the distance between the second side 804 and the upper surface of the teeth 816. This slight difference in distance means that the upper surface of the teeth 816 is slightly recessed from the first side 802 of the second pole member 800. This slight recess in combination with the corresponding slight recess provided in the first pole member 400 forms a cavity of a size sufficient to accommodate the rotating brake member 600. When the second pole member 800 is secured to the first pole member 400 and the cover 50 by means of assembly bolt 64, a cavity is defined between first pole member 400 and second pole member 800 of a size and shape sufficient to accommodate the rotating assembly of the first hub member 500, the brake member 600 and the second hub member 700. In the assembled position the recesses 814, between the teeth 812 of the second pole member 800, in combination with the second surface 614 of the brake member 600 define an air passage way which directs air to flow over the second side 614 of the brake member 600 and thereafter to proceed by means of the air exhaust holes 810 provided in the second pole member 800 to the exterior of the hysteresis brake assembly 200. As previously noted, the second pole member 800 is provided with a plurality of assembly holes 828. These assembly holes 828 are located around the perimeter of the second pole member and extend axially through the second pole member. The assembly holes 828 are so positioned such that when the assembly bolt 64 passes through the first pole member and the second pole member, the teeth of the first pole member are aligned with the recesses of the second pole member. This can be observed in the illustration shown in FIG. 9.

Figure 9:
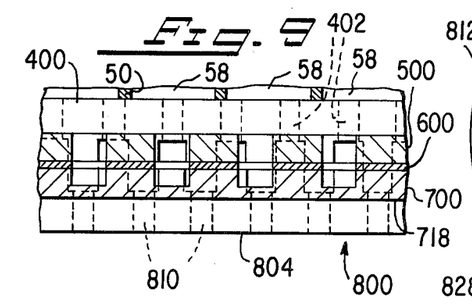
FIG. 9 is a cutaway view taken along the section line 9—9 of FIG. 3 illustrating the assembled relationship of various of the parts illustrated in FIGS. 3 through 8.

FIG. 9 is a sectional view taken along the section line 9—9 of FIG. 1. This view shows the assembled relationship between the cover member 50, the first pole member 400, the first hub member 500, the brake member 600, the second hub member 700 and the second pole member 800. Shown in this FIGURE are the air inlet holes 58 provided in member 50. The air exhaust holes 402 which appear in dashed lines on the first pole member 400. This figure also illustrates the air exhaust holes 810, also shown in dashed lines in the second pole member 800 and indicates the location of the second side 804 of the second pole member 800. The second side 718 of the hub member 700 is also indicated. This figure can be used to illustrate the fact that the teeth 406 of the first pole member 400 are aligned with the recesses 814 of the second pole member 800. However, this is not really shown clearly because of the presence in FIG. 9 of the fist hub member and the second hub member, 500 and 700 respectively.

In an attempt to simplify the desired illustration, FIG. 10 has been included. FIG. 10 is basically the same as FIG. 9 except that the cover member 50, the first hub member 500 and the second hub member 700 have been removed. The remaining members which are clearly illustrated in FIG. 10 show the offset relationship between the teeth 406 of the first pole member 400 and the teeth 812 of the second pole member 800. Each of the teeth 406 are located opposite recesses 814. The location of the brake member 600 is also shown in FIG. 10. This offset relationship is well known to the art of eddy current type hysteresis clutch and brake devices and the inclusion of FIG. 10 is merely meant to serve the purpose of a clear illustration of portions of the above desription. With the above description of the device of the present invention in mind, the following operational description of the eddy current type hysteresis brake is offered.

As the fan 20, inner bearing member 34, first hub member 500, brake member 600 and second hub member 700 rotate as a unit with respect to the cover member 50, first pole member 400 and second pole member 800, the fan blades 22 propel air through the air inlet holes 58 provided in cover member 50. Upon passing through the air inlet holes 58, the flow of air encounters the rotating air flow holes 514 of the first hub member 500. The air flows through these holes 514 and thereupon encounters the front surface 520 of a vane 512 provided on the first hub member 500. The air vanes 512 break the flow of air into two portions so that it follows two paths.

A first portion of air is directed radially outward through a recess 528 formed by two adjacent vanes. In so doing the air flows over a portion of the first side of the brake member 600. As the air flows further outward and reaches the outward radial limit of the first hub member 500, it encounters the teeth and recesses located on the first pole member 400. The air is directed to flow along the channels formed by the recesses 408 located between the teeth 406 of the first pole member 400. The air continues to flow radially outward along these channels and over the first side of the brake member 600 thereby cooling the first side 612 of the brake member 600.

A second portion of the air flowing through the air flow holes 514 continues in the same axial direction and passes through the air flow holes 604 provided in the brake member 600. As the air passes to the second side 614 of the brake member 600, it encounters the front surface 710 of an arcuate vane 708 provided on the second hub member 700. These vanes 708, in a manner similar to the vanes 512 of the first hub member, direct the flow of air radially outward along the channels formed by the recesses 724 between adjacent vanes so that it flows over the second side 614 of the brake member 600. As this air reaches the outward radial limit of the arcuate vanes 708 of the second hub member 700 it encounters the teeth 812 and recesses 814 of the second pole member 800. The freely flowing air flows along the channels defined by the recesses 814 and thus flows over the second side 614 of the brake member 600 and cools that second side.

Since the rotating fan 20 continues to force air along this same path, the air on the interior of this hysteresis brake assembly is somewhat pressurized and forces the air which has just cooled the sides of the brake member 600 to flow out the air exhaust holes 810 provided in the second pole member 800 and the other part of this air to flow out the first pole member 400 through the air exhaust holes 402, and then through the air exhaust holes 60 provided in the cover member 50 to the exterior of the hysteresis brake assembly.

From the above description of the nature and operation of the device of the present invention, it can be seen that Applicant has provided an eddy current hysteresis brake assembly which employs a flat disc shaped brake member and which because of the high cooling capacity is also able to operate at a braking torque level equal to or greater than the torque developed by a comparably sized brake assembly which employs a cup shaped brake as was the practice in the prior art. Because this eddy current hysteresis brake assembly employs a flat disc shaped brake member it is simple to manufacture and lower in cost of manufacture than brake assemblies of the prior art. Another advantage is that the flat brake member minimizes adverse effects due to excessive heating since the flat member is symmetrical and is evenly cooled on both sides. The hysteresis brake assembly of the present invention is of very compact design due to the fact that the brake member is a flat disc. This compact structure requires a reduced amount of materials for its construction when compared with the materials required for the cup shaped hysteresis brakes of the prior art. The structure disclosed herein results in an eddy current type hysteresis brake assembly which is very smooth in its operation because of its symmetry and which suffers minimum warpage and wear due to heating. The minimum wear results in a longer brake life. The disclosed structure provides a compact eddy current hysteresis type brake assembly which generates higher braking torques than similar brake assemblies of different design and larger size because the greater cooling efficiency allows stronger magnetic fields to be employed in the present invention.

Figure 11:
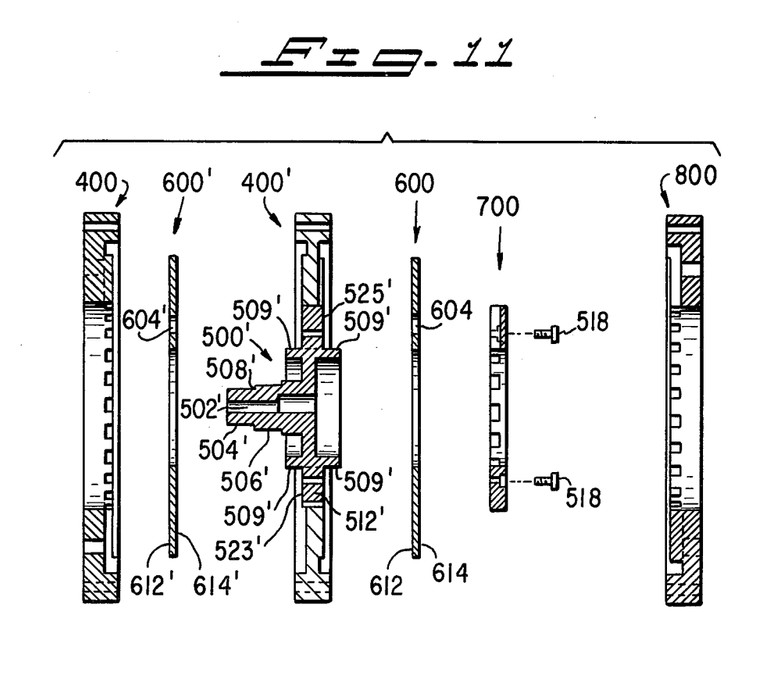
FIG. 11 illustrates an alternate embodiment of the device of the present invention which employs a plurality of brake disc members.

An alternate embodiment of the present invention is illustrated in FIGS. 11 through 15. This embodiment, employing a plurality of brake disc members is particularly adapted to provide large braking torque. FIG. 11 is very similar in format to FIG. 3 except that many members have not been shown in FIG. 11 which are substantially unchanged in their appearance as illustrated in FIG. 3. FIG. 11 does show pole members 400 and 800 for purposes of reference to FIG. 3, even though those members are substantially as shown in FIG. 3. The element which has been substantially modified in the multiple brake member embodiment is the first hub member shown as 500 in FIG. 3 and as 500' in FIG. 11. The pole member 400' is a new element, not present in FIG. 3, and more completely illustrated in FIGS. 13, 14 and 15. The brake disc 600' is identical to the brake disc 600 shown in FIG. 6.

Figure 12:
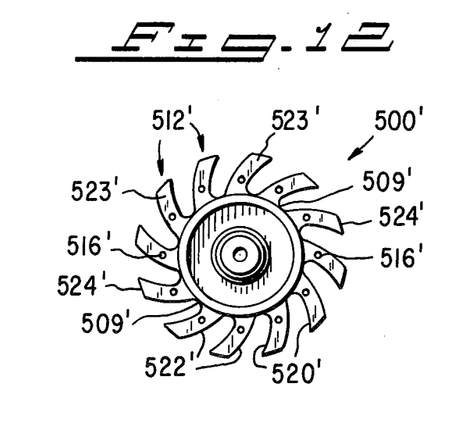
FIG. 12 is a side view of the alternate embodiment of the first hub member looking in the direction indicated as 12—12 in FIG. 11.

FIGS. 11 and 12 illustrate the configuration of the alternate embodiment hub member 500' which supports brake discs 600 and 600'. The hub member 500' is provided with a threaded axial hole 502'. This internally threaded hole has threads which mate with the external threads of the axial bolt 10. The hub member 500' is also provided with an exterior axially extending cylindrical surface designated 504', the diameter of which is slightly less than the diameter of the inner cylindrical surface 32 of the inner bearing member 34. This outer cylindrical surface 504' intersects a radially extending surface 506' and thereby defines a seat 508'. This seat 508' seats the inner bearing member 34 on the first hub member 500'. The first hub member 500' is provided with an exterior axially extending cylindrical surface 509'. Located along the middle portion of surface 509' and extending radially outward therefrom is a plurality of arcuate air vanes 512'. As shown in FIG. 12, these air vanes 512' are equally spaced around the perimeter of surface 509'. These air vanes 512' propel air, flowing through the air flow holes 604' on the new brake disc 600', so as to flow radially outward over the second side 614' of brake disc 600' and over the first side 612 of brake disc 600. A plurality of non-threaded assembly holes 516' is provided on said hub member 500' so as to allow the threaded assembly bolts 518 to pass through the hub member 500' to the brake disc member 600'. Assembly bolts 518 secure the second hub member 700 and the brake disc members 600' and 600 to the first hub member 500'. Each arcuate air vane 512' is defined by the exterior axially extending cylindrical surface 509' (see FIG. 12), a front surface 520', a rear surface 522' a first side 523', a second side 525' and end surface 524'. Each air flow hole 604' and 604 communicates with a space between adjacent air vanes 512'. When the first hub member 500' is secured between the brake disc 600' and brake disc 600, the first side 523' and second side 525' of the hub member are placed in intimate contact with the second side 614' of brake disc 600' and the first side 612 of brake disc 600 respectively. It can thus be seen that an air passageway is formed and defined by the second side 614' of brake disc 600', the space between adjacent air vanes 512' and the first side 612 of brake disc 600.

Figure 13:
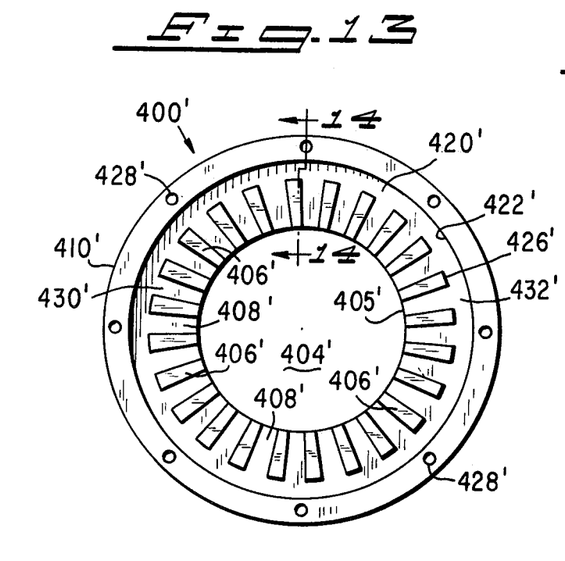
FIG. 13 is an illustration of the alternate embodiment of a pole member looking in the direction indicated as 13—13 in FIG. 11.

FIG. 13 illustrates the configuration of pole member 400' which must be added to the configuration of FIG. 3 when multiple brake discs are employed. Pole member 400' is provided with a hole 404' defined by the interior cylindrical surface 405' which is of a diameter slightly larger than the outer diameter of hub member 500' as defined by the end surfaces 524' of the air vanes 512'. The pole member 400' is thus capable of receiving the hub member 500' within the hole 404'. Located radially around the hole 404' is a plurality of teeth 406' separated by a plurality of recesses 408'. The recess 408' serves as a channel which directs the flow of air radially outward. It should be noted, as more clearly shown in FIG. 15, that the teeth 406' on the first side 412' of pole member 400' are located opposite the recesses 408' located on the second side 414' of pole member 400'. This allows the same pole member 800 to be used whether there is a single brake disc or multiple brake discs. The pole member 400' is bounded by the outer cylindrical surface 410', the inner cylindrical surface 405', the first side numbered 412' and the second side 414'.

Figure 14:
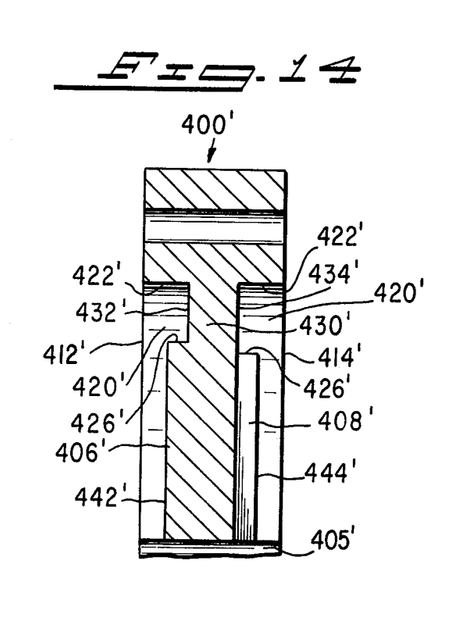
FIG. 14 is a partial sectional view of the pole member illustrated in FIG. 13 taken along the section line 14—14.

FIG. 14 is a partial cross sectional view of the pole member 400' taken along the section line 14—14 of FIG. 13. FIG. 14 shows the teeth 406' connected by a webbing 430' having a first side 432' and a second side 434'. The teeth 406' located on the first side 432' have an upper surface designated 442', while the teeth located on the second side 434' have an upper surface designated 444'.

It should be noted that the distance from the first side 432' of the webbing 430' to the first side 412' of pole member 400' is greater than the distance from the first side 432' to the upper surface 442' thereby providing a slight axial recess between side 412' and surface 442'. This slight recess, in combination with a similar slight recess provided on pole member 400 forms a cavity within which brake disc member 600' rotates. Similarly a recess is provided between the second side 414' of pole member 400' and upper surface 444', which in combination with the similar slight recess provided on pole member 800 forms a cavity within which brake disc member 600 rotates. Two annular cavities 420' are provided, one on each side of pole member 400'. The purpose of the cavities is to receive an electrically conductive means such as a coil of wire. Each annular cavity is partially defined by a first surface designated as 422', an axially extending cylindrical surface, a second surface which is either surface 432' or 434', and a series of third surfaces designated 426' which constitute the radially outer end surfaces of the plurality of teeth 406'. These cavities cooperate with the similar cavities 420 and 820 to receive the coils of wire (not shown). Passing axially through pole member 400' is a plurality of assembly holes 428' aligned with the assembly holes 428 on pole member 400 which allows the assembly bolt 64 to pass through the pole members to mate with the threaded holes 62 located on cover member 50.

The brake disc member 600, hub member 700, and pole member 800 are substantially as described in the preferred embodiment.

Figure 15:
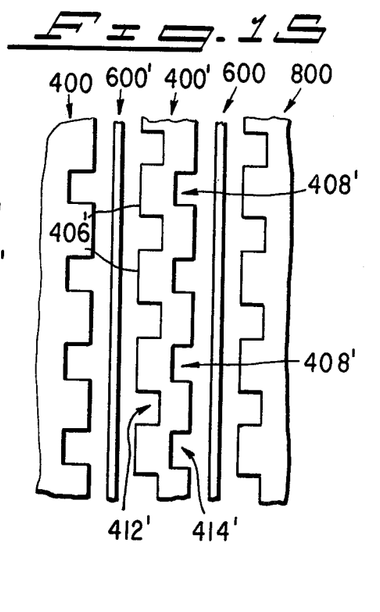
FIG. 15 is a simplified illustration of the assembled relationship between the various pole members and brake disc members of the alternate embodiment.

The assembly of the above described apparatus will result in a device which has a configuration as illustrated in FIG. 15. FIG. 15 is a figure corresponding to FIG. 10 used to illustrate the preferred embodiment.

FIG. 15 illustrates the assembled relationship between the pole member 400, the brake disc member 600', the pole member 400' with its two sided alternating teeth and recesses, the brake disc member 600 and pole member 800.

The operation of this alternate embodiment of the present invention is very similar to the operation of the preferred embodiment. The basic principal of operation being to generate a flow of air which is thereafter, by suitable placement of air vanes and air passage holes, directed to flow over both sides of each brake disc member so as to cool the members.

As the fan 20, inner bearing member 34, brake disc member 600', hub member 500', second brake disc member 600, and second hub member 700 rotate as a unit with respect to the cover member 50, first pole member 400, second pole member 400' and third pole member 800, the fan blades 22 propel air through the air inlet holes 58 provided in cover member 50. Upon passing through the air inlet holes 58, the flow of air encounters the brake disc member 600' and by reason of the air flow holes 604' is divided into two portions.

The first portion of air is directed radially outward over the first side 612' of brake disc 600', through the recesses 408 on the first pole member 400, through the air exhaust holes 402, and exits through the air exhaust holes 60 located on cover member 50. As the air flows over the first side 612' it cools this side of the brake disc 600'.

The second portion of air consists of that portion which flows through the air flow holes 604' provided on brake disc member 600'. As this air passes to the second side 614' of brake disc member 600' it encounters the arcuate air vanes 512' which again splits the second portion of air flow into two parts, a third portion and a fourth portion.

The third portion is that portion which is caused by the arcuate air vanes 512' to flow radially outward through the passage formed by the spaces between adjoining vanes 512' so as to flow over the second side 614' of the first brake disc member 600' and the first side 612 of the second brake disc member 600. This third portion of air flow continues radially outward until it encounters the teeth 406' located on each side of pole member 400'. At this point the flow is separated into two parts. The first part proceeds radially outward along the recesses 408' located between the teeth 406' on the first side 412' of pole member 400'. It then flows over the edge of brake disc member 600' and joins with the first portion of air flow to eventually exit through the air exhaust holes 60 located in cover member 50. The second part of the third portion of air flow follows a similar path through the recesses 408' on the second side 414' of pole member 400' over the edge of brake disc member 600 and out the air exhaust holes 810 in pole member 800.

The fourth portion of air flow is that which flows axially through the air flow holes 604 on brake disc member 600 where it encounters the arcuate air vanes 708 on the hub member 700. This fourth portion then follows a path through the recesses 724, between the arcuate air vanes 708, through the recesses 814 on pole member 800, where it joins the second part of the third portion of air flow and exits through the air exhaust holes 810.

The above described air flow pattern results in cooling of both sides of brake disc members 600 and 600' by flowing air.

With an understanding of the operation of the above described alternate embodiment it is readily apparent that a hysteresis brake could be assembled according to the teachings of the present invention employing three or even more brake disc members.

Having thus described the structure, operation and advantages of the device of the present invention with reference to this preferred embodiment, and having described an alternate embodiment, it will be understood by those skilled in the art that various changes in form and details therein may be made without departing from the spirit and scope of this invention. The embodiments disclosed herein are given for the purpose of illustration and are not to be construed as limiting the scope of any of the following claims.

What is claimed is:

1. An electradynamic brake assembly comprising:
 a fan;
 first and second hub members; and
 a flat disc shaped brake member located between said hub members and having a first and second side;
 all of which rotate about a common axis;
 said fan being provided with a plurality of blades which generate a flow of air which proceeds axially toward said first hub member;
 said first hub member being provided with means to divide said flow of air into a first portion and a second portion;
 said first portion being directed radially outward so as to flow over the first side of said brake member;
 said second portion being directed axially toward said second hub member through a plurality of axially extending air flow holes provided in said brake member whereby air flows through the brake member from the first side of the brake member to the second side of the brake member at which point the air flow is redirected by means provided on said second hub member to flow in a radially outward direction so as to flow over said second side of said brake member;
 whereby said brake member is equally and uniformly cooled on both its first and second sides by flowing air.

2. An electrodynamic brake assembly according to claim 1 wherein the fan, the first and second hub members and flat disc shaped brake member are secured against rotation relative to one another.

3. An electrodynamic brake assembly according to claim 1 wherein the means provided on said first hub member to divide said flow of air into two portions comprises a plurality of air flow holes each of which is paired with one of a plurality of arcuate vane members;
 said air flow holes extending axially from a first side of said first hub member through said first hub member to a second side of said first hub member whereby the air which is propelled axially by said fan is caused to flow from said first side of said first hub member to said second side of said first hub member;
 each of said arcuate vane members having a front surface and a back surface and being located such that air which flows through said air flow holes, on said first hub member, is partly redirected by the front surface of said arcuate vane members so as to follow a radially outward path, and partly allowed to continue its axially directed path.

4. An electrodynamic brake assembly according to claim 3 wherein:
 said air flow holes on said first hub member are equally spaced from one another and located at a uniform radial distance from the axis of said first hub member; and
 said arcuate vane members extend radially outward and are equally spaced around the periphery of said second side of said first hub member, each arcuate vane member being located between adjacent air flow holes such that the air flow holes are near the back surfaces of each arcuate vane member, and such that each air flow hole communicates with the recess defined between adjacent arcuate vane members.

5. An electrodynamic brake assembly comprising:
 a fan;
 a cover, having a plurality of air inlet holes and a plurality of air exhaust holes;
 a first pole member and a second pole member, each said pole member provided with a plurality of radially extending teeth defining a plurality of recesses therebetween, and further provided with a plurality of air exhaust holes;
 a first hub member provided with a plurality of air flow holes and provided with a plurality of arcuate vane members defining a plurality of recesses therebetween;
 a brake member having a first and a second side and provided with a plurality of air flow holes;

a second hub member provided with a plurality of arcuate vane members defining a plurality of recesses therebetween;

said fan being so positioned that rotation of said fan generates an axially directed flow of air which flows through said air inlet holes of said cover, and through said air flow holes of said first hub member at which point said arcuate vane members of said first hub member divide said flow of air into a first portion and a second portion;

said first portion being directed radially outward so as to flow over said first side of said brake member through said recesses on said first pole member and thereafter through said air exhaust holes on said first pole member and said cover;

said second portion being allowed to continue axially through said air flow holes in said brake member at which point said second portion is directed radially outward by said plurality of arcuate vane members of said second hub member so as to flow over said second side of said brake member through said recesses on said second pole member and thereafter flows through said exhaust holes on said second pole member;

whereby said brake member is equally and uniformly cooled on both sides thereof.

6. An electrodynamic brake assembly according to claim 8 wherein said brake member is a flat disc shaped brake member.

7. An electrodynamic brake assembly according to claim 6 wherein;

said air inlet holes of said cover member extend axially through said cover member, are equally spaced from one another and located at a first radial distance from the axis of said cover member;

said air exhaust holes of said cover member extend axially through said cover member are equally spaced from one another and located at a second radial distance from the axis of said cover member;

said second radial distance being greater than said first radial distance;

said air exhaust holes of said first pole member extend axially through said first pole member, are equally spaced from one another and located at said second radial distance from the axis of said first pole member and in communication with said air exhaust holes of said cover member and also in communication with said recesses of said first pole member;

said air flow holes of said first hub member extend axially through said first hub member, are equally spaced from one another and located at said first radial distance from the axis of said first hub member, and are in communication with said recesses defined on said first hub member and also in spaced communication with said air inlet holes of said cover member;

said recesses on said first pole member being axially aligned so as to communicate with said recesses on said first hub member;

said air flow holes provided on said brake member extend axially through said brake member, are equally spaced from one another, located at said first radial distance from the axis of said brake member and are in communication with said recesses provided on said first hub member and with said recesses defined on said second hub member;

said recesses on said second hub member being axially aligned so as to communicate with said recesses on said second pole member;

said air exhaust holes of said second pole member extend axially through said second pole member, are equally spaced from one another and located at said second radial distance from the axis of said second pole member and in communication with said recesses of said second pole member.

8. An electrodynamic brake assembly according to claim 6 wherein:

said brake member is positioned between said hub members;

said brake member and said hub members are collectively positioned between said first pole member and said second pole member in a cavity defined by the adjacent opposing surfaces of said first pole member and said second pole member;

said first pole member is positioned between said cover member and said second pole member;

said first pole member is in contact with said cover member and said second pole member.

9. An electrodynamic brake assembly according to claim 8 wherein:

said fan, first hub member, brake member and second hub member are secured against rotation relative to one another and are rotatable with respect to said cover member, first pole member and said second pole member which are secured against rotation relative to one another.

10. An electrodynamic brake assembly comprising:

a means for providing an air flow;

a plurality of air flow directing means comprising at least a first air flow directing means and a last air flow directing means;

a plurality of brake members comprising at least a first brake member and a next brake member which may also be the last brake member, each such brake member having a first side, a second side, and a plurality of axially extending holes extending from said first side to said second side;

said air flow being directed so as to encounter said first side of one of said plurality of brake members so as to divide said air flow into a first portion and a second portion;

said first portion being caused to flow over said first side of said one of said plurality of brake members;

said second portion being caused to flow from said first side of said one of said plurality of brake members through said holes in said one of said plurality of brake members to the second side of said one of said plurality of brake members where it is itself divided into a further first portion and a further second portion;

said further first portion being directed by one of said plurality of air flow directing means to flow over the second side of said one of said plurality of brake members and over the first side of the next brake member;

said further second portion being directed to follow a path similar to the path of said second portion such that at each successive encounter with an air flow directing means said further second portion is itself divided again into two parts, until said further second portion encounters the said last air flow directing means whereby said further second portion is directed to flow air over the second surface of the last brake member;

whereby said first side and said second side of each of said plurality of brake members are cooled by flowing air.

11. An electrodynamic brake assembly according to claim 10 wherein said means for providing an air flow is a fan.

12. An electrodynamic brake assembly according to claim 10 wherein said plurality of air flow directing means comprises a plurality of hub members each provided with a plurality of radially extending arcuate air flow directing vanes.

13. An electrodynamic brake assembly according to claim 12 wherein each of said plurality of brake members is a flat disc shaped brake member.

14. An electrodynamic brake assembly comprising:
a fan;
a plurality of hub members comprising at least a first and last hub member and a plurality of flat disc shaped brake members comprising at least a first and a last brake member each having a first and second side;
all of which rotate about a common axis;
said fan being provided with a plurality of blades which generate a flow of air which proceeds axially toward said plurality of hub members;
at least one of said plurality of hub members being provided with means to divide said flow of air into a first portion and a second portion;
said first portion being directed radially outward so as to flow over the surface of a plurality of said brake members;
said second portion being directed axially toward another of said plurality of hub members through a plurality of axially extending air flow holes provided in said plurality of brake members whereby air flows successively through the brake members from the first side of each brake member to the second side of each brake member and through said plurality of hub members until said second portion reaches said last hub member at which point the air flow is redirected by means provided on said last hub member to flow in a radially outward direction so as to flow over said second side of said last brake member;
whereby each of said plurality of brake members is cooled on both its first and second sides by flowing air.

15. An electrodynamic brake assembly according to claim 1 wherein the fan, the plurality of hub members and plurality of flat disc shaped brake members are secured against rotation relative to one another.

16. An electrodynamic brake assembly according to claim 14 wherein the means provided at least one of said hub members to divide said flow of air into two portions comprises a plurality of arcuate vane members;
each of said arcuate vane members having a front surface and a back surface and being located such that air which flows through said air flow holes located on said plurality of brake members is partly redirected by the front surface of said arcuate vane members so as to follow a radially outward path, and partly allowed to continue its axially directed path.

17. An electrodynamic brake assembly according to claim 16 wherein:
said arcuate vane members extend radially outward and are equally spaced around the periphery of at least one of said plurality of hub members, each arcuate vane member being positioned between adjacent air flow holes located on said plurality of brake members such that the air flow holes are near the back surfaces of each arcuate vane member, and such that each air flow hole communicates with the space defined between adjacent arcuate vane members.

18. An electrodynamic brake assembly comprising:
a fan;
a cover, having plurality of air inlet holes and a plurality of air exhaust holes;
a plurality of pole members comprising at least a first sole member, a second sole member and a last sole member, each pole member being provided with a plurality of radially extending teeth defining air passageways therebetween;
at least the first and last pole members being further provided with a plurality of air exhaust holes;
a plurality of hub members comprising at least a first hub member and a last hub member each being provided with a plurality of arcuate vane members defining air passageways therebetween;
a plurality of brake members comprising at least a first brake member and a last brake member, each said brake member having a first and a second side and being provided with a plurality of air flow holes;
said fan being so positioned that rotation of said fan generates an axially directed flow of air which flows through said air inlet holes of said cover where it encounters the first side of said first brake member and is caused to divide into two portions;
said first portion being directed radially outward so as to flow over said first side of said first brake member through said air passageways on said first pole member and thereafter through said air exhaust holes on said first pole member and said cover;
said second portion being allowed to continue axially through said air flow holes in said first brake member where said second portion encounters the plurality of arcuate vane members of one of said plurality of hub members and is thereby further divided into two portions one of which flows over the second side of one of said plurality of brake members and the first side of another of said plurality of brake members and the other part of which continues its axial flow to successively and alternatively flow through the air flow holes of each of said plurality of brake members and encounter each of said plurality of hub members and be again divided into two parts until the last of said other parts encounters the last hub member whereby it is directed by said plurality of arcuate vane members on said last hub member to flow radially outward over said second side of said last brake member through the air passageways on said last hub member and said last pole member and thereafter flows through said exhaust holes on said last pole member;
whereby each of said plurality of brake members is cooled on both its first side and its second side.

19. An electrodynamic brake assembly according to claim 18 wherein said plurality of brake members are each a flat disc shaped brake member.

20. An electrodynamic brake assembly according to claim 19 wherein:

said air inlet holes of said cover member extend axially through said cover member, are equally spaced from one another and located at a first radial distance from the axis of said cover member;

said air exhaust holes of said cover member extend axially through said cover member are equally spaced from one another and located at a second radial distance from the axis of said cover member;

said second radial distance being greater than said first radial distance;

said air exhaust holes of said first pole member extend axially through said first pole member, are equally spaced from one another and located at said second radial distance from the axis of said first pole member and in communication with said air exhaust holes of said cover member and also in communication with said air passageways said first pole member;

said air flow holes provided on said plurality of brake members extend axially through said plurality of brake members, are equally spaced from one another, located at said first radial distance from the axis of said plurality of brake members and are in communication with said air passageways provided on said plurality of hub members;

said air passageways on said last hub member being axially aligned so as to communicate with said air passageways on said last pole member;

said air exhaust holes of said last pole member extend axially through said last pole member, are equally spaced from one another and located at said second radial distance from the axis of said last pole member and in communication with said air passageways of said last pole member.

21. An electrodynamic brake assembly according to claim 20 wherein:

said fan, said plurality of hub members, and said plurality of brake members are secured against rotation relative to one another and are rotatable with respect to said cover member, and said plurality of pole members which are secured against rotation relative to one another.

* * * * *